(12) United States Patent
Ogura (10) Patent No.: US 12,504,410 B2
(45) Date of Patent: Dec. 23, 2025

(54) MASS SPECTROMETRY CONTROL DEVICE, MASS SPECTROMETRY DEVICE, MASS SPECTROMETRY METHOD AND A NON-TRANSITORY COMPUTER READABLE MEDIUM STORING PROGRAM

(71) Applicant: SHIMADZU CORPORATION, Kyoto (JP)

(72) Inventor: Tairo Ogura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 552 days.

(21) Appl. No.: 18/021,717

(22) PCT Filed: Aug. 24, 2020

(86) PCT No.: PCT/JP2020/031814
§ 371 (c)(1),
(2) Date: Aug. 18, 2023

(87) PCT Pub. No.: WO2022/044071
PCT Pub. Date: Mar. 3, 2022

(65) Prior Publication Data
US 2023/0400440 A1  Dec. 14, 2023

(51) Int. Cl.
*G01N 30/86* (2006.01)
*G01N 33/68* (2006.01)

(52) U.S. Cl.
CPC ..... *G01N 30/8606* (2013.01); *G01N 33/6848* (2013.01)

(58) Field of Classification Search
USPC ......................................................... 250/288
See application file for complete search history.

(56) References Cited

U.S. PATENT DOCUMENTS

2016/0025741 A1  1/2016  Lock et al.
2023/0384263 A1*  11/2023  Ogura ................ G01N 33/6848

FOREIGN PATENT DOCUMENTS

WO  WO 2013/033713 A1  3/2013

OTHER PUBLICATIONS

Mar. 20, 2024, Chinese Office Action issued for related CN Application No. 202080103459.8.
Nov. 10, 2020, International Search Report issued for related PCT Application No. PCT/JP2020/031814.
Nagai et al., Development of a Method for Crustacean Allergens Using Liquid Chromatography/Tandem Mass Spectrometry, Journal of AOAC International, 2015, pp. 1355-1365, vol. 98, No. 5.

* cited by examiner

*Primary Examiner* — Kiet T Nguyen
(74) *Attorney, Agent, or Firm* — Paratus Law Group, PLLC (57) ABSTRACT

A mass spectrometry control device includes a deriver that derives, based on a set of allergens that are detectable without being distinguished from one another among a plurality of allergens to be detected and data that indicates a plurality of peptides produced by subjecting each allergen to a cleavage process, first peptides produced in common when the plurality of allergens included in the set are subjected to the cleavage process and at least one of parameters for detecting the first peptides, and a setter that sets a condition of mass spectrometry to detect at least one of the first peptides.

9 Claims, 6 Drawing Sheets

TABLE A

| | WHEAT | BARLEY | RYE | ... |
|---|---|---|---|---|
| MRM1 | ○ | | | |
| MRM2 | ○ | ○ | ○ | |
| MRM3 | ○ | | | |
| MRM4 | | ○ | ○ | |
| MRM5 | | | | |
| MRM6 | ○ | | | |
| MRM7 | | ○ | | |
| MRM8 | | | ○ | |
| MRM9 | | ○ | ○ | |
| MRM10 | ○ | ○ | ○ | |
| MRM11 | | | ○ | |
| MRM12 | ○ | | ○ | |
| MRM13 | ○ | | | |
| MRM14 | | | ○ | |
| MRM15 | ○ | | | |
| MRM16 | ○ | | | |
| ⋮ | | | | |

NOT DISTINGUISHED FROM ONE ANOTHER (WHEAT, BARLEY, RYE)

TABLE A

NOT DISTINGUISHED FROM ONE ANOTHER

| | WHEAT | BARLEY | RYE | ... |
|---|---|---|---|---|
| MRM1 | ○ | | | |
| MRM2 | ○ | ○ | ○ | |
| MRM3 | ○ | | | |
| MRM4 | | ○ | ○ | |
| MRM5 | | | | |
| MRM6 | ○ | | | |
| MRM7 | | ○ | | |
| MRM8 | | | ○ | |
| MRM9 | | ○ | ○ | |
| MRM10 | ○ | ○ | ○ | |
| MRM11 | | | ○ | |
| MRM12 | ○ | | ○ | |
| MRM13 | ○ | | | |
| MRM14 | | | ○ | |
| MRM15 | ○ | | | |
| MRM16 | ○ | | | |
| ⋮ | | | | |

FIG. 4

TABLE A

NOT DISTINGUISHED FROM ONE ANOTHER

| | WHEAT | BARLEY | RYE | ... |
|---|---|---|---|---|
| MRM1 | ○ | | | |
| MRM2 | ○ | ○ | ○ | |
| MRM3 | ○ | | | |
| MRM4 | | ○ | ○ | |
| MRM5 | | | | |
| MRM6 | ○ | | | |
| MRM7 | | ○ | | |
| MRM8 | | | ○ | |
| MRM9 | | ○ | ○ | |
| MRM10 | ○ | ○ | ○ | |
| MRM11 | | | ○ | |
| MRM12 | ○ | | ○ | |
| MRM13 | ○ | | | |
| MRM14 | | | ○ | |
| MRM15 | ○ | | | |
| MRM16 | ○ | | | |
| ⋮ | | | | |

MASS SPECTROMETRY CONTROL DEVICE, MASS SPECTROMETRY DEVICE, MASS SPECTROMETRY METHOD AND A NON-TRANSITORY COMPUTER READABLE MEDIUM STORING PROGRAM

CROSS REFERENCE TO PRIOR APPLICATION

This application is a National Stage Patent Application of PCT International Patent Application No. PCT/JP2020/031814 (filed on Aug. 24, 2020) under 35 U.S.C. § 371, which is hereby incorporated by reference in its entirety.

TECHNICAL FIELD

The present invention relates to a mass spectrometry control device, a mass spectrometry device, a mass spectrometry method and a non-transitory computer readable medium storing a program.

BACKGROUND ART

For the purpose of prevention of the development of allergies, or identification of substances that may cause allergies when the allergies develop, etc., detection of allergens from food or beverage products, or environments, etc. is carried out. Patent Document 1 reports that an allergen is degraded by trypsin, and a produced peptide is subjected to liquid chromatography/mass spectrometry (Liquid chromatography/Mass spectrometry; LC/MS), so that an allergen contained in a sample is detected.

CITATION LIST

Patent Document

Patent Document 1 WO 2013/033713 A1

SUMMARY OF INVENTION

Technical Problem

In order to efficiently detect allergens, an appropriate peptide selected from a plurality of peptides derived from a plurality of allergens to be detected is desirably detected.

Solution to Problem

A first aspect of the present invention is directed to a mass spectrometry control device that includes a deriver that derives, based on a set of allergens that are detectable without being distinguished from one another among a plurality of allergens to be detected and data that indicates a plurality of peptides produced by subjecting each allergen to a cleavage process, first peptides produced in common when the plurality of allergens included in the set are subjected to the cleavage process and at least one of parameters for detecting the first peptides, and a setter that sets a condition of mass spectrometry to detect at least one of the first peptides.

A second aspect of the present invention is directed to a mass spectrometry device that includes the mass spectrometry control device of the first aspect.

A third aspect of the present invention is directed to a mass spectrometry method including deriving, based on a set of allergens that are detectable without being distinguished from one another among a plurality of allergens to be detected and data that indicates a plurality of peptides produced by subjecting each allergen to a cleavage process, first peptides produced in common when the plurality of allergens included in the set are subjected to the cleavage process and at least one of parameters for detecting the first peptides, and setting a condition of mass spectrometry to detect at least one of the first peptides.

A fourth aspect of the present invention is directed to a non-transitory computer readable medium storing a program for causing a processor to execute deriving processing that derives, based on a set of allergens that are detectable without being distinguished from one another among a plurality of allergens to be detected and data that indicates a plurality of peptides produced by subjecting each allergen to a cleavage process, first peptides produced in common when the plurality of allergens included in the set are subjected to the cleavage process and at least one of parameters for detecting the first peptides, and setting processing that sets a condition of mass spectrometry to detect at least one of the first peptides.

Advantageous Effects of Invention

With the present invention, an appropriate peptide selected from a plurality of peptides derived from a plurality of allergens to be detected can be detected, and allergens can be efficiently detected.

DESCRIPTION OF EMBODIMENTS

Embodiments for carrying out the present invention will be described below with reference to the drawings.

Embodiments

In the present embodiment, a plurality of allergens to be detected are subjected to a cleavage process, and peptides produced by this cleavage process are detected by mass spectrometry. A mass spectrometry control device of the present embodiment sets peptides to be detected by this mass spectrometry. In the embodiment provided below, an allergen to be detected is referred to as a target allergen, whereas an allergen not to be detected is referred to as a non-target allergen.

In the following description, a molecule that causes allergy is referred to as an allergenic molecule, a substance such as a food or beverage product that contains the allergenic molecule is referred to as an allergenic substance, and the allergenic molecule and the allergenic substance are referred to as allergens. For example, milk that is an allergenic substance contains casein and lactoglobulin as allergenic molecules. A chicken egg that is an allergenic substance contains ovalbumin and lysozyme as allergenic molecules. A peptide includes a peptide main chain composed of a plurality of amino acids bonded by peptide bond and may include a modification group and the like if the peptide is detectable by mass spectrometry.

(Regarding Sample)

A sample is not limited in particular as long as the sample includes an allergen or may include an allergen. A sample can be a food or beverage product that is unknown as to whether the food or beverage product includes an allergen. In this case, it can be identified which allergen is included in the food or beverage product by a mass spectrometry method in accordance with the present embodiment. If a food or beverage product ingested by a patient who has developed allergy or the patient's vomit or the like is taken as a sample, information as to an allergen that causes the allergy can be obtained, which may be useful for determination or research of courses of treatment. Alternatively, a sample can be a food or beverage product that is known for including an allergen, and the allergen included in this food or beverage product may be checked or quantitatively analyzed. A sample other than the food or beverage product can include any substance such as pollen, house dust or ticks as long as an allergenic molecule is detectable by mass spectrometry. The allergenic molecule included in a target allergen is preferably protein.

(Preparation of Sample for Analysis)

An enzyme that breaks down a protein is added to a prepared sample, and an allergen is subjected to a cleavage process. An allergenic molecule is cleaved by the enzyme, so that a plurality of peptides derived from the allergen are produced. While the enzyme is not limited in particular as long as the enzyme has specificity of a cleavage position in regard to protein cleavage, trypsin or Lys-C is preferable as the enzyme. A position of cleavage by trypsin includes a position of cleavage by Lys-C. Therefore, with both of trypsin and Lys-C added to the sample, a sequence specificity of the cleavage by trypsin enables more reliable decomposition of allergens. The allergenic molecule contained in the sample may be cleaved by chemical cleavage rather than enzymatic cleavage. Peptides produced by the cleavage process of allergens are hereinafter referred to as allergen-derived peptides.

With the sample subjected to the cleavage process, a sample for analysis is prepared from the sample that includes the allergen-derived peptides. The sample for analysis can be prepared by being subjected to a preprocess corresponding to the type of analysis performed on the sample such as extraction of a protein.

(Regarding Mass Spectrometry Device)

Figure 1:
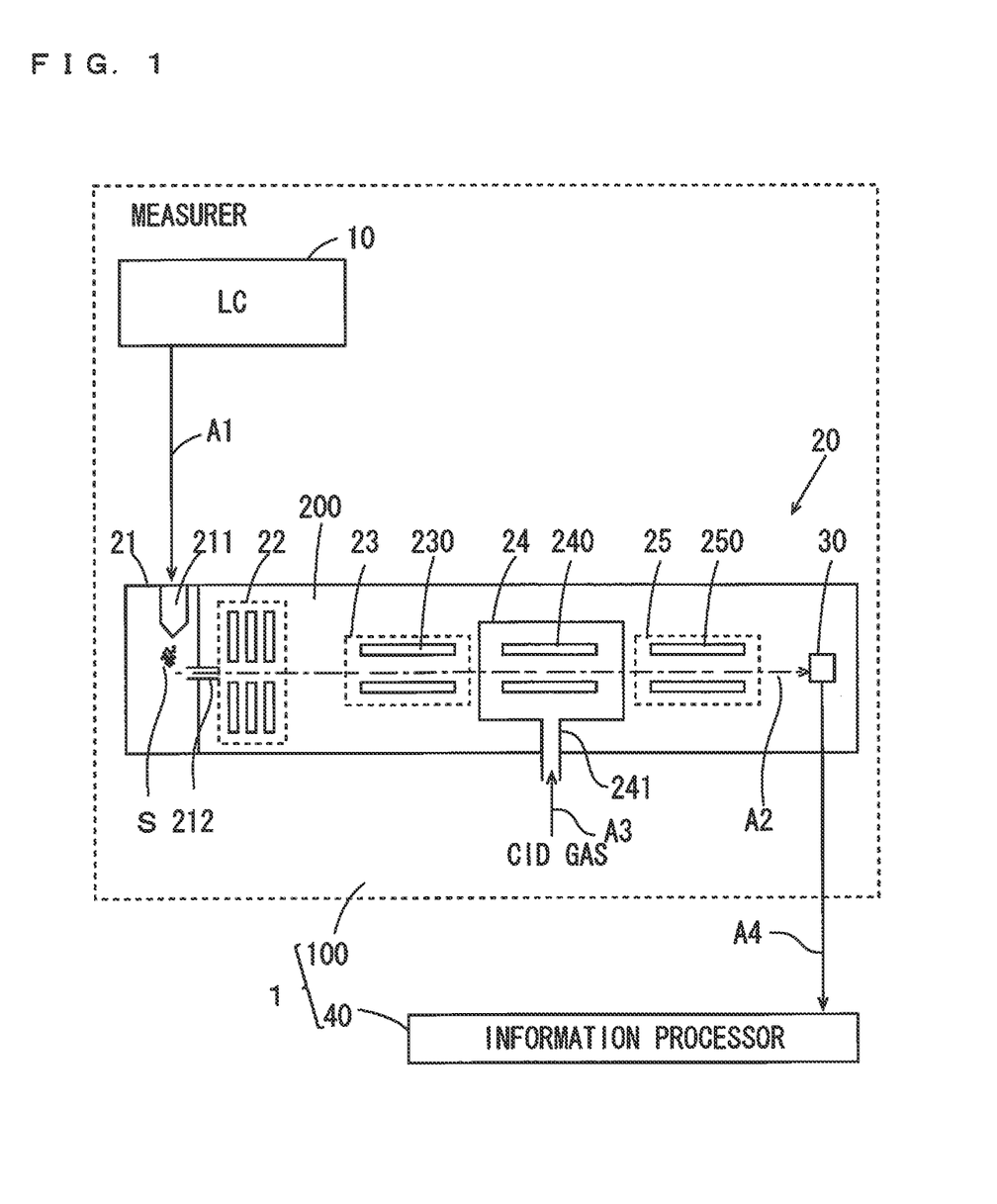
FIG. 1 is a conceptual diagram showing the configuration of a mass spectrometry device according to one embodiment.

FIG. 1 is a conceptual diagram showing the configuration of a mass spectrometry device 1 in accordance with the present embodiment. The mass spectrometry device 1 includes a measurer 100 and an information processor 40. The measurer 100 includes a Liquid Chromatograph (Liquid Chromatograph; LC) 10 and a mass spectrometer 20. The mass spectrometry device 1 is a Liquid Chromatograph-Mass Spectrometer (Liquid Chromatograph-Mass Spectrometer; LC-MS) capable of performing LC/MS.

In a case where there are not many types of molecules included in a sample, the mass spectrometry device 1 may perform tandem mass spectrometry as a mass spectrometer that does not include an LC rather than as the LC-MS. The tandem mass spectrometry is hereinafter two or more-stage mass spectrometry.

The mass spectrometer 20 includes an ionizer 21 that includes an ion source 211, a vacuum container 200 and a pipe 212 that introduces ions from the ionizer 21 to the vacuum container 200. The vacuum container 200 includes an ion guide 22, a first mass separator 23, a collision cell 24, a second mass separator 25 and a detector 30. The mass separator 23 includes a first quadrupole 230. The collision cell 24 includes an ion guide 240 and a gas inlet port 241. A second mass separator 25 includes a second quadrupole 250.

The LC 10 separates an introduced sample by liquid chromatography to elute each component included in the sample in a different retention time. The type of the LC 10 is not limited in particular as long as the LC 10 can separate each of allergen-derived peptides so as to be capable of detecting the allergen-derived peptides with a desired accuracy in mass spectrometry. A nano LC, a micro LC, a High-Performance Liquid Chromatograph (High-Performance Liquid Chromatograph; HPLC) or a Ultra High Performance Liquid Chromatograph (Ultra High Performance Liquid Chromatograph; UHPLC), etc. can be used as the LC 10. An elution sample that includes the allergen-derived peptides eluted from the LC 10 is introduced into the ionizer 21 of the mass spectrometer 20 (the arrow A1).

The mass spectrometer 20 performs tandem mass spectrometry on the elution sample that includes the allergen-derived peptides introduced from the LC 10. In the present embodiment, the mass spectrometer 20 is a triple quadrupole mass spectrometer and detects sample-derived ions S by Multiple Reaction Monitoring (Multiple Reaction Monitoring; MRM). The mass spectrometer 20 ionizes the elution sample, produces the sample-derived ions S, mass-separates the sample-derived ions S, dissociates the mass-separated sample-derived ions S, produces product ions, mass-separates the produced product ions, and detects the mass-separated product ions. The product ions produced by the dissociation of the sample-derived ions S are also included in the sample-derived ions S in the description provided below.

The ionizer 21 of the mass spectrometer 20 ionizes the elution sample including the allergen-derived peptides introduced into the ionizer 21. While an ionization method is not limited in particular as long as ionization occurs to an extent that product ions are detected with a desired accuracy, Electrospray Ionization (Electrospray Ionization; ESI) is preferable as the ionization method. A description is made also in the following embodiment, assuming that ESI is performed. The ion source 211 is an ion source for ESI. The sample-derived ions S produced by the ionizer 21 are moved by a difference in pressure between the ionizer 21 and the vacuum container 200 or an action of a voltage applied to an electrode (not shown), etc., and enter the ion guide 22 through the pipe 212. FIG. 1 schematically shows a path of the sample-derived ions S by the one-dot and dash arrow A2.

The ion guide 22 includes a quadrupole or a ring-shape electrode, etc. appropriately arranged in a vacuum chamber or the like not shown in which pressure is reduced in stages. The pressure is $10^{-2}$ Pa, etc. in a vacuum chamber arranged in the first mass separator 23. The ion guide 22 converges a flow of the sample-derived ions S using an electromagnetic action to emit the flow to the first mass separator 23.

The first mass separator 23 allows ions having a set m/z to selectively pass therethrough as precursor ions using an electromagnetic action based on a voltage applied to the first quadrupole 230, and emits the ions toward the collision cell 24. While an m/z is used as a mass-to-charge ratio in the following description, as long as a value indicates the ratio of the mass to the charge of ions, the value is not limited in particular. The first mass separator 23 allows precursor ions having an m/z set by a setter 522 described below to selectively pass therethrough.

The collision cell 24 dissociates the precursor ions by Collision-Induced Dissociation (Collision-Induced Dissociation; CID) to produce product ions while controlling the movement of the sample-derived ions S using the ion guide 240 including a quadrupole. A gas that includes a molecule with which the precursor ions collide during the CID (hereinafter referred to as the CID gas) is introduced from the gas inlet port 241 so as to cause a predetermined pressure in the collision cell (the arrow A3). While the type of the CID gas is not limited in particular as long as the CID gas can cause the CID with a desired efficiency, an inert gas such as argon or nitrogen is preferable. The produced product ions are emitted toward the second mass separator 25.

The second mass separator 25 allows product ions having a set m/z to selectively pass therethrough using an electromagnetic action based on a voltage applied to the second quadrupole 250, and emits the product ions toward the detector 30. The second mass separator 25 allows product ions having an m/z set by the setter 522 described below to selectively pass therethrough.

The second mass separator 25 may be configured as a linear ion trap that includes the second quadrupole 250 as necessary.

The detector 30 includes an ion detector such as a secondary electron multiplier tube or a photoelectron multiplier tube and detects the incident product ions. A detection signal obtained by the detection of the product ions is A/D-converted by an Analog/Digital (Analog/Digital; A/D) converter not shown, input to the information processor 40 as a digital signal, and stored in a storage 43 (the arrow A4). Hereinafter, data based on a detection signal obtained by the detection of the sample-derived ions S by the detector 30 is referred to as measurement data.

The information processor 40 includes an information processing device such as an electronic computer. The information processor 40 serves as an interface with a user of the mass spectrometry device 1 (hereinafter simply referred to as the user) and also executes controlling of the measurer 100 and processing such as communication, storage, calculation, etc. in regard to various data. The information processor 40 serves as a mass spectrometry control device that controls mass spectrometry, etc. of the mass spectrometer 20.

The information processor 40 may be configured as one device integrated with the LC 10 or the mass spectrometer 20. Further, part of data used in the present embodiment may be saved in a remote server or the like.

Figure 2:
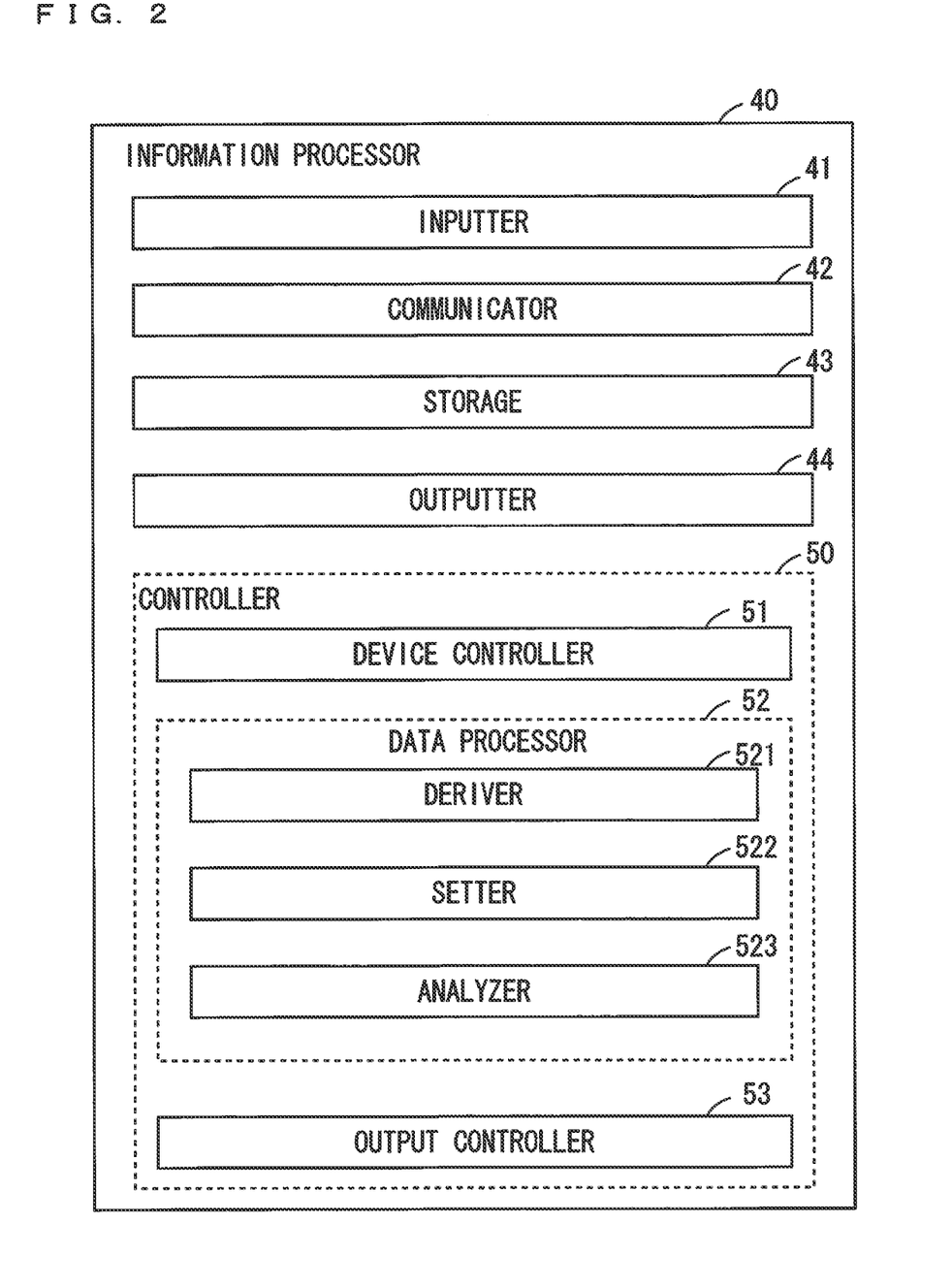
FIG. 2 is a conceptual diagram showing an information processor in the mass spectrometry device.

FIG. 2 is a conceptual diagram showing the configuration of the information processor 40. The information processor 40 includes an inputter 41, a communicator 42, a storage 43, an outputter 44 and a controller 50. The controller 50 includes a device controller 51, a data processor 52 and an output controller 53. The data processor 52 includes a deriver 521, a setter 522 and an analyzer 523.

The inputter 41 of the information processor 40 is constituted by an input device such as a mouse, a keyboard, various buttons or a touch panel. The inputter 41 receives information required for controlling an operation of the measurer 100, information required for processing to be executed by the controller 50 and so on from the user.

The communicator 42 of the information processor 40 is constituted by a communication device that can communicate via wireless or wired connection through a network such as the Internet. The communicator 42 suitably transmits and receives necessary data.

The storage 43 of the information processor 40 is constituted by a non-volatile storage medium and stores an analysis condition, measurement data and a program for execution of processing by the controller 50, etc. Reference data described below is stored in the storage 43.

The outputter 44 of the information processor 40 is constituted by a display device such as a liquid crystal monitor or a printer, and displays information relating to measurement of the measurer 100 or information obtained by processing of the data processor 52, etc. on the display device, or prints the information on paper media.

The controller 50 of the information processor 40 is constituted by a processor such as a Central Processing Unit (Central Processing Unit; CPU) and a storage medium such as a memory, and functions as a main constituent for an operation of controlling the mass spectrometry device 1. The controller 50 serves as a processing device that executes processing of setting an allergen-derived peptide to be detected, etc. The controller 50 retains a program stored in the storage 43 or the like in the memory and executes various processing in response to the execution of the program by the processor.

As long as the controller 50 of the present embodiment can execute the processing, the physical configuration or the like of the controller 50 is not limited in particular.

The device controller 51 of the controller 50 controls the operation of each component of the measurer 100 so as to satisfy an analysis condition set by the setter 522 described below.

The data processor 52 of the controller 50 processes data relating to mass spectrometry. The data processor 52 executes data processing for setting an analysis condition in mass spectrometry and an analysis of measurement data obtained by the mass spectrometry.

When a plurality of target allergens are subjected to a cleavage process, the deriver 521 of the data processor 52 derives peptides that are produced in common with the plurality of target allergens.

If a certain allergen-derived peptide is a peptide that is specifically produced in a case where a specific allergen is subjected to a specific cleavage process, information as to whether the specific allergen is included in the sample is obtained by mass-separating and detecting the certain allergen-derived peptide.

On the other hand, in a case where a plurality of allergens are subjected to a specific cleavage process, it is assumed that a same allergen-derived peptide is produced from each of these allergens. In this case, the same allergen-derived peptide is mass-separated and detected, so that information as to whether at least one of those plurality of allergens is included in the sample is obtained without the plurality of allergens, from which the same allergen-derived peptide is derived, being distinguished from one another. An efficient analysis can be performed in some cases by utilizing this information. In the following embodiment, when a same allergen-derived peptide is produced when a plurality of target allergens are subjected to a specific cleavage process, this allergen-derived peptide is referred to as a common peptide with respect to the plurality of target allergens. In the present embodiment, an analysis condition is set such that at least one of common peptides is detected.

The deriver 521 acquires information indicating target allergens. This information is referred to as target allergen information. In the present embodiment, it is assumed that there are a plurality of target allergens. A method of expressing target allergen information is not limited in particular as long as this information can indicate target allergens. The target allergen information can include an identification number or name of each of a plurality of target allergens to be detected, for example. Here, sets of a plurality of allergens to be detected are stored in advance in the storage 43 depending on countries, regions or the like. It may be configured that any of the sets is selected on the basis of a user's input or the like. In this case, the identification number or name of each of the plurality of allergens included in the selected set is stored as the target allergen information in the storage 43. Alternatively, it may be configured that the user may select an allergen to be detected from the allergens displayed on a display device of the outputter 44 through the inputter 41.

The deriver 521 acquires information as to a set of a plurality of allergens that are detectable without being distinguished from one another in the plurality of target allergens. This information is referred to as set information. While a method of expressing set information is not limited in particular, the set information can be expressed by, for example, a set of numerals of identification numbers of a plurality of allergens that are detectable without being distinguished from one another. In a specific example, the identification numbers of wheat, barley and rye are 1, 2, and 3, respectively. In this case, it can be expressed by the set of numerals (1, 2, 3) that these wheat, barley and rye can be detected without being distinguished from one another.

For example, set information is defined in advance in the sets of the plurality of allergens depending on countries, regions or the like as described above, and the deriver 521 can set the set information in accordance with a set of allergens selected by the user. For example, in Europe, a demand for detecting barley and rye while distinguishing them from each other tends to be lower. Thus, the deriver 521 can generate set information indicating that barley and wheat can be detected without being distinguished from each other based on the user's selection or depending on a country, a region or the like registered by the user. Whether to detect the plurality of target allergens while distinguishing them from one another as described above can be set based on differences in allergen among countries or regions, differences in reactivity of human beings and the like who ingest or contact allergens for each country or region, or differences in regulation for each country or region, etc. For example, regarding allergenic substances in which cross reactivity is observed such as wheat, barley and rye, it is preferable in some cases that these allergenic substances are detected without being distinguished from one another in terms of efficiency.

In addition, regarding a set of predetermined allergens such as wheat, barley and rye, it may be configured that the user can select whether to detect these allergens while distinguishing them from one another through the inputter 41. The set of predetermined allergens is selected from a plurality of allergens having a common peptide and displayed on a display screen. Alternatively, it may be configured that the user can specifically set the set of predetermined allergens by inputting logical formulae and the like through the inputter 41.

The deriver 521 derives a common peptide based on set information and reference data. Reference data here is data indicating a plurality of allergen-derived peptides produced in a case where each allergen is subjected to a specific cleavage process. The specific cleavage process is preferably a trypsin process, a Lys-C process, or a trypsin and Lys-C process. However, the reference data can be constructed in regard to any cleavage process in accordance with an allergen-derived peptide produced by each cleavage process.

Figure 3:
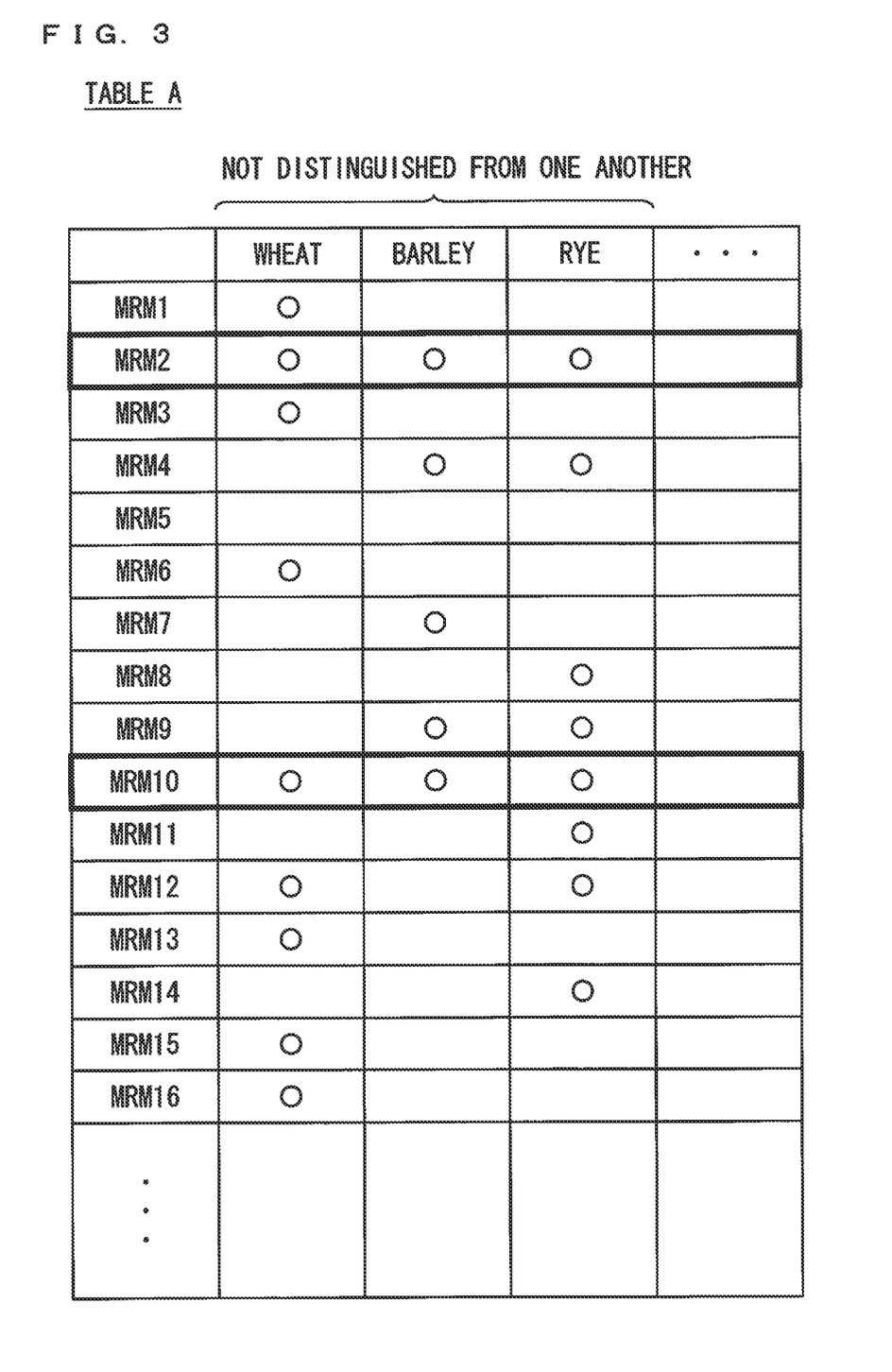
FIG. 3 is a table showing reference data.

FIG. 3 is a diagram showing Table A that schematically shows the reference data. In the reference data, transitions for detecting allergen-derived peptides obtained by the cleavage process for each of a plurality of allergens such as wheat, barley and rye are indicated. The reference data is prepared for each type of cleavage process, for example, in a case where the cleavage process is performed by trypsin. In FIG. 3, while the names of allergens such as "wheat" and "barley" are indicated, these names may be associated with target allergens that are set using identification numbers or the like. The reference data can be expressed using a sequence, etc. as appropriate.

A transition refers to a set of a m/z of a precursor ion and a m/z of a product ion when a specific ion is detected by tandem mass spectrometry. Since an ion can be detected with high specificity by a two or more-stage mass separation, a transition and a peptide correspond to each other on a substantially one-to-one basis. Thus, as shown in Table A, allergen-derived peptides may be expressed using parameters such as the transitions for detecting the allergen-derived peptides. In this case, the deriver 521 derives a parameter for detecting a common peptide based on the set information and the reference data. Such a parameter may be the m/z of a precursor ion.

In Table A, the transitions are each denoted by a name sequentially numbered after "MRM." In a case where allergens such as wheat, barley and rye can be detected by each transition, a hollow circle o is marked at the position of a corresponding allergen in the transition. For example, Table A refers to reference data on a cleavage process by trypsin. As for "MRM12," wheat and rye are marked with o. This represents that a common peptide produced from each of the wheat and the rye by a trypsin process is detected by mass spectrometry using the transition of MRM12.

The allergen included in the reference data may be either an allergenic substance or an allergenic molecule. As the allergenic substances, milk, chicken egg, wheat, barley, rye, oat, mustard, sesame, macadamia nuts, pistachio nuts, Brazil nuts, walnuts, peanuts and hazelnuts can be included in the reference data. As the allergenic molecules contained in these allergenic substances, ovalbumin, lysozyme, casein, lactoglobulin, high molecular weight glutenin, low molecular weight glutenin, wheat protein, rye protein, oat protein, barley protein, mustard protein, sesame protein, macadamia nut protein, pistachio nut protein, Brazil nut protein, walnut protein, peanut protein and hazelnut protein can be included in the reference data. These allergenic molecules can be measured using transitions described in Patent Document 1. As other allergens that can be included in the reference data, various allergens such as buckwheat, shrimp or crab can be included depending on transitions and the like for detecting peptides produced by a specific cleavage process.

The deriver 521 derives common peptides of a plurality of target allergens included in set information, or the transitions of the common peptides. For example, in a case where the wheat, the barley and the rye can be detected without being distinguished from one another, MRM2 and MRM10 surrounded by the thick line in FIG. 3 are the transitions corresponding to the common peptides.

Figure 4:
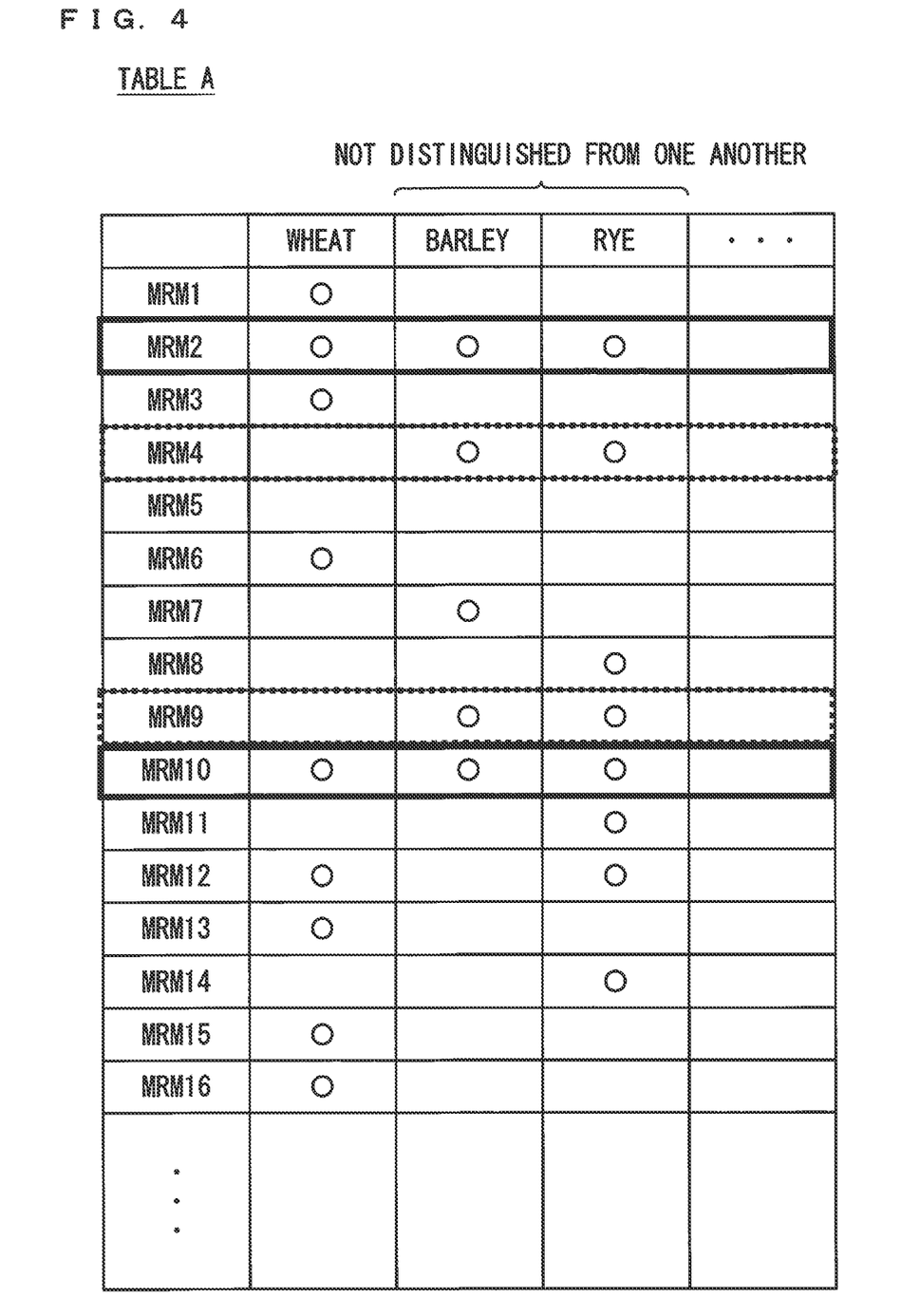
FIG. 4 is a table showing reference data.

FIG. 4 is Table A schematically showing, as another example, a case where a plurality of target allergens are wheat, barley and rye, and the barley and the rye are not distinguished from each other, but the wheat and the barley or the wheat and the rye are distinguished from each other.

The barley and the rye are set in set information as a set that is detectable without being distinguished from each other. In this case, MRM2, MRM4, MRM9 and MRM10 that detect common peptides produced from each of the barley and the rye are the transitions corresponding to the common peptides (the rows surrounded by the thick solid line or the thick dashed line). As shown by MRM2 and MRM10 surrounded by the thick solid line, common peptides may also be produced from allergens other than the barley and the rye, which are the allergens included in the set information. This is because it is more important that a false negative possibility is not increased even if a false positive possibility increases.

In a case where a common peptide is produced also from an allergen other than the target allergens included in the set information, the deriver 521 derives a candidate peptide or a transition of the candidate peptide from the common peptide or a transition of the common peptide. An allergen that is not included in the set information, but is included in the reference data is referred to as a reference allergen.

The deriver 521 sets, as a candidate peptide, a peptide obtained from common peptides excluding the common peptide produced from the reference allergen by the cleavage process corresponding to the reference data. In Table A, the wheat is a reference allergen, and common peptides produced also from the wheat correspond to MRM2 and MRM10 among MRM2, MRM4, MRM9 and MRM10. Thus, the deriver 521 sets, as the candidate peptides, peptides corresponding to the transitions MRM4 and MRM9 (the rows surrounded by the thick dashed line) excluding MRM2 and MRM10 among from the transitions MRM2, MRM4, MRM9 and MRM10 corresponding to the common peptides.

An allergen that is not to be detected, but is included in the reference data is referred to as a non-detection allergen. The deriver 521 may derive, as the candidate peptide, a peptide obtained from the common peptides excluding the common peptide produced from the non-detection allergen. In this case also, the range of the common peptides can be smaller, and the allergens included in the set information can be more accurately detected. Also, the deriver 521 may derive the transitions of the candidate peptides.

The setter 522 of the data processor 52 sets a condition of mass spectrometry so as to detect at least one of the common peptides or at least one of the candidate peptides. The setter 522 can set the condition of mass spectrometry so as to detect a candidate peptide in a case where the candidate peptide is derived and detect a common peptide in a case where the candidate peptide is not derived.

The setter 522 sets a transition corresponding to the common peptide or the candidate peptide as a transition for use in mass spectrometry of a sample. In the example of FIG. 3, the setter 522 sets at least one of MRM2 and MRM10, which are the transitions of the common peptides as the transition for use in mass spectrometry of the sample. In the example of FIG. 4, the setter 522 sets at least one of MRM4 and MRM9, which are the transitions of the candidate peptides as the transition for use in mass spectrometry of the sample. Furthermore, the setter 522 sets at least one of MRM1, MRM3, MRM6, MRM13, MRM15 and MRM16, which are the transitions corresponding to the peptides specifically produced from the wheat, as the transition for use in mass spectrometry of the sample. A method of selecting one or more peptides to be detected from a plurality of common peptides or a plurality of candidate peptides is not limited in particular. For example, it may be configured that the output controller 53 controls the outputter 44 to display a plurality of candidate peptides on the display device, and the user selects a candidate peptide to be detected through the inputter 41. Alternatively, the setter 522 may either select a candidate peptide that is likely to be detected or likely to have a detection signal with high intensity or select a candidate peptide in a random manner.

The analyzer 523 of the data processor 52 executes an analysis of measurement data. The measurement data indicates the intensity of a detection signal detected by the detector 30 during each transition. The analyzer 523 integrates the intensity of the detection signal at every time corresponding to each transition and identifies the integrated intensity as a detection intensity of a peptide corresponding to each transition.

The analyzer 523 identifies that an allergen-derived peptide that has a detection intensity equal to or more than a preset threshold value is included in the sample subjected to the cleavage process. The analyzer 523 generates information as to whether an allergen from which the allergen-derived peptide is derived is included in the sample on the basis of whether the allergen-derived peptide corresponding to each transition is detected. In the example of FIG. 3, if the detection intensity is equal to or more than the threshold value in both or either of MRM2 and MRM10, the analyzer 523 can determine that any of the wheat, the barley and the rye is included in the sample and can generate information as to the determination. The analyzer 523 may calculate a summed amount or a summed concentration of the wheat, the barely and the rye included in the sample using a peptide with a high detection intensity. A method of analyzing the measurement data by the analyzer 523 is not limited in particular.

The output controller 53 controls the outputter 44 to display and output the analysis condition or the information obtained by the analysis of the analyzer 523 on the display device.

Figure 5:
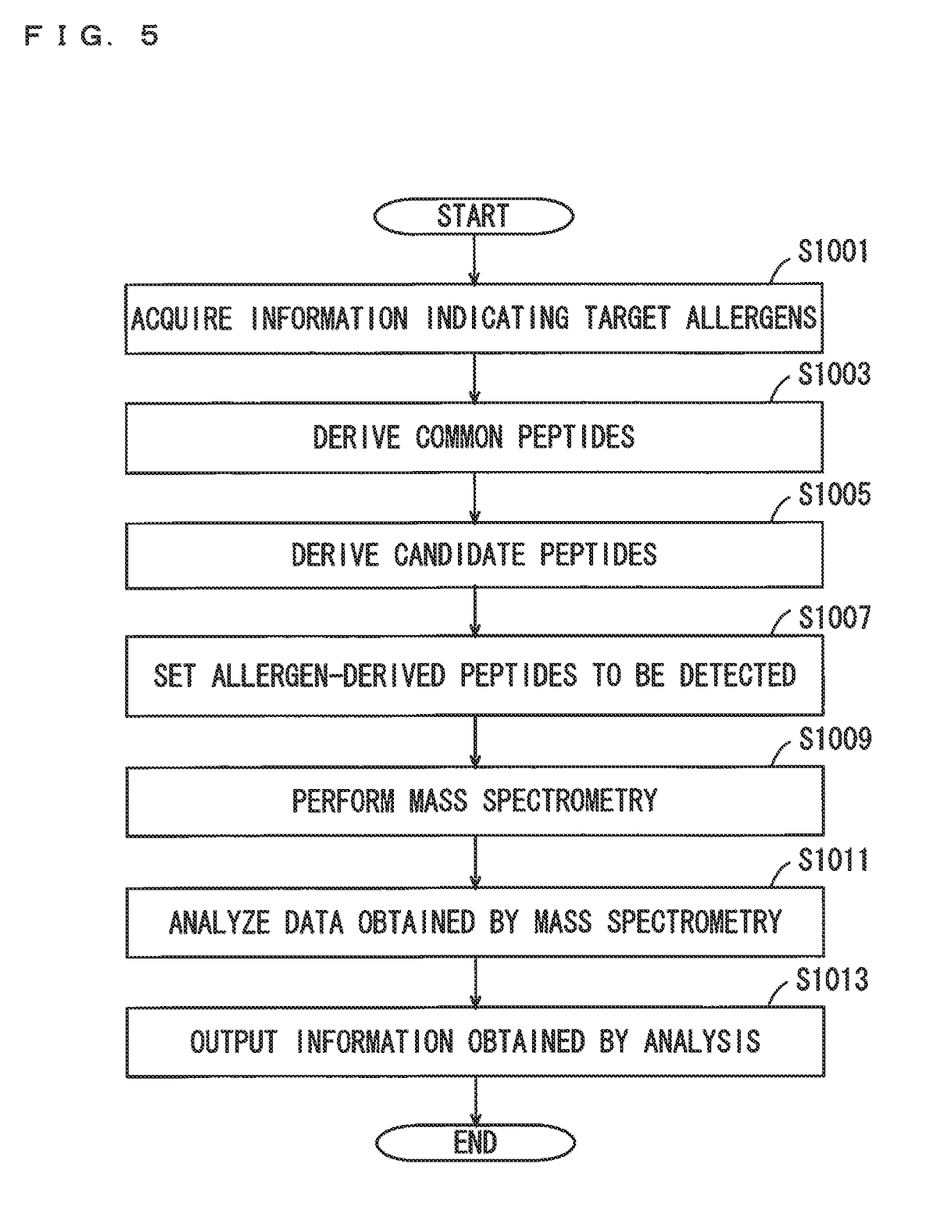
FIG. 5 is a flowchart showing a flow of a mass spectrometry method according to one embodiment.

FIG. 5 is a flowchart showing a flow of a mass spectrometry method in accordance with the present embodiment. Each step of FIG. 5 is suitably executed by the controller 50 of the mass spectrometry device 1. In step S1001, the deriver 521 acquires target allergen information indicating target allergens. When step S1001 ends, step S1003 is started.

In step S1003, the deriver 521 derives common peptides. When step S1003 ends, step S1005 is started. In step S1005, the deriver 521 derives candidate peptides from the common peptides. When step S1005 ends, step S1007 is started.

In step S1007, the setter 522 sets allergen-derived peptides to be detected in mass spectrometry. The output controller 53 appropriately displays peptides to be detected on the display device of the outputter 44. In a case where the peptides to be detected are quantified, the user can see information of the displayed allergen-derived peptides to be detected and add an internal standard of the allergen-derived peptides to be detected to a sample for analysis. When step S1007 ends, step S1009 is started. In step S1009, the device controller 51 controls the measurer 100 to perform mass spectrometry. When step S1009 ends, step S1011 is started.

In step S1011, the analyzer 523 analyzes data obtained by the mass spectrometry to generate information as to detection of allergens. When step S1011 ends, step S1013 is started. In step S1013, the output controller 53 controls the outputter 44 to output the information obtained by the analysis. When step S1013 ends, the processing ends.

Modified examples as shown below are also in the scope of the present invention and can be combined with the above-mentioned embodiment. In the below-mentioned modified examples, parts having structure and functions similar to those of the above-mentioned embodiment are denoted with the same reference numerals, and a description will suitably be not repeated.

Modified Example 1

While the mass spectrometry device 1 includes the triple quadrupole mass spectrometer in the above-mentioned embodiment, the type of a mass spectrometer is not limited in particular as long as the mass spectrometer can mass-separate and detect an allergen-derived peptide. The mass spectrometer 20 can include a plurality of mass analyzers of any type such as ion trap mass analyzers or time-of-flight mass analyzers. Even a mass spectrometer that cannot perform MRM can detect product ions by product ion scanning, etc. Also, a dissociation method is not limited in particular to CID, and dissociation can be performed by any method such as electron capture dissociation or electron transfer dissociation.

Modified Example 2

A program for implementing an information processing function of the mass spectrometry device 1 may be recorded on a computer-readable recording medium. Then, a computer system may read the program, which is recorded on the recording medium, in regard to the control of processing executed by the above-mentioned deriver 521 and setter 522 and its related processing and execute the program. The "computer system" here includes hardware such as an OS (Operating System) or peripheral devices. Further, the "computer-readable recording medium" refers to a movable recording medium such as a flexible disc, an optical magnetic disc, an optical disc or a memory card and a storage device such as a hard disc or a Solid State Drive (Solid State Drive; SSD) built in the computer system. Moreover, the "computer-readable recording medium" may include an object that dynamically retains a program for a short period of time such as a communication wire that is used when the program is transmitted through a network such as the Internet or a line such as a telephone line, or an object that retains a program for a certain period of time such as a volatile memory in a computer system that serves as a server or a client. Further, the above-mentioned program may be used to implement part of the above-mentioned functions and may further be used to implement the above-mentioned functions by being combined with a program that has already been recorded in the computer system.

Figure 6:
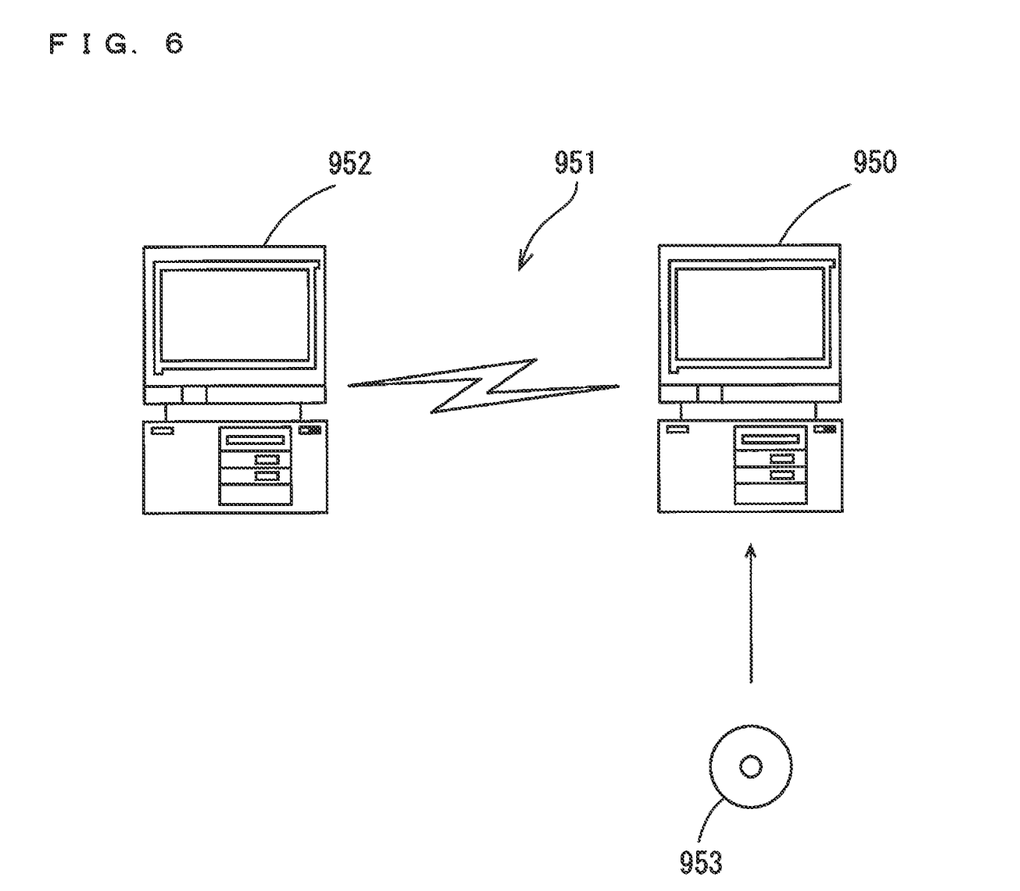
FIG. 6 is a conceptual diagram for explaining provision of a program.

Moreover, in a case where the program relating to the above-mentioned control is applied to a personal computer (hereinafter referred to as a PC), the program can be provided via a recording medium such as a CD-ROM or a data signal such as the Internet. FIG. 6 is a diagram showing its appearance. A PC 950 receives a program via a CD-ROM 953. Further, the PC 950 has a function to be connected to a communication line 951. The computer 952 is a server computer that provides the above-mentioned program and stores the program in a recording medium such as a hard disc. The communication line 951 is a communication line such as the Internet or a personal computer communication line, or a dedicated communication line. The computer 952 reads a program with the use of a hard disc and transmits the program to the PC 950 through the communication line 951. That is, the program is transported by a carrier wave as a data signal and transmitted through the communication line 951. In this manner, the program can be provided as a computer-readable computer program product in various forms such as a recording medium or a carrier wave.

(Aspects)

It is understood by those skilled in the art that the plurality of above-mentioned illustrative embodiments or modifications are specific examples of the below-mentioned aspects.

(Item 1) A mass spectrometry control device according to one aspect includes a deriver that derives, based on a set of allergens that are detectable without being distinguished from one another among a plurality of allergens to be detected and data (reference data) that indicates a plurality of peptides produced by subjecting each allergen to a cleavage process, first peptides (common peptides) produced in common when the plurality of allergens included in the set are subjected to the cleavage process and at least one of parameters for detecting the first peptides, and a setter that sets a condition of mass spectrometry to detect at least one of the first peptides. Thus, an appropriate peptide selected from the plurality of peptides derived from the plurality of allergens to be detected can be detected, and allergens can be efficiently detected.

(Item 2) In a mass spectrometry control device according to another aspect, in the mass spectrometry control device of the aspect of the item 1, the deriver derives, from the first peptides, second peptides (candidate peptides) obtained excluding a peptide produced when an allergen not to be detected or an allergen other than the plurality of allergens included in the set is subjected to the cleavage process, and at least one of parameters for detecting the second peptides, and the setter sets a condition of mass spectrometry to detect at least one of the second peptides. Thus, allergens to be detected can be more accurately detected.

(Item 3) In a mass spectrometry control device according to another aspect, in the mass spectrometry control device of the aspect of the item 1 or 2, the plurality of allergens are a plurality of allergens selected from milk, chicken egg, wheat, barley, rye, oat, mustard, sesame, macadamia nuts, pistachio nuts, Brazil nuts, walnuts, peanuts, hazelnuts, buckwheat, shrimp, crab, ovalbumin, lysozyme, casein, lactoglobulin, high molecular weight glutenin, and low molecular weight glutenin. Thus, these allergens can be efficiently detected.

(Item 4) In a mass spectrometry control device according to another aspect, in the mass spectrometry control device of the aspect of any of the items 1 to 3, cleavage by at least one of trypsin and Lys-C is performed in the cleavage process. Since these enzymes are widely used and a lot of data are accumulated, the analysis can be further efficiently performed using the accumulated data.

(Item 5) In a mass spectrometry control device according to another aspect, in the mass spectrometry control device of the aspect of any of the items 1 to 4, the setter sets a condition of tandem mass spectrometry or liquid chromatography/tandem mass spectrometry. Thus, allergens can be detected also from a sample containing many foreign substances by two or more-stage mass spectrometry.

(Item 6) In a mass spectrometry control device according to another aspect, in the mass spectrometry control device of the aspect of any of the items 1 to 5, the parameter includes a mass-to-charge ratio of precursor ions in the mass spectrometry. Thus, peptides derived from the allergens to be detected can be more reliably detected.

(Item 7) A mass spectrometry control device according to one aspect includes the mass spectrometry control device of the aspect of any of the items 1 to 6. Thus, an appropriate peptide selected from the plurality of peptides derived from the plurality of allergens to be detected can be detected, and allergens can be efficiently detected.

(Item 8) A mass spectrometry method according to one aspect includes deriving, based on a set of allergens that are detectable without being distinguished from one another among a plurality of allergens to be detected and data (reference data) that indicates a plurality of peptides produced by subjecting each allergen to a cleavage process, first peptides (common peptides) produced in common when the plurality of allergens included in the set are subjected to the cleavage process and at least one of parameters for detecting the first peptides, and setting a condition of mass spectrometry to detect at least one of the first peptides. Thus, an appropriate peptide selected from the plurality of peptides derived from the plurality of allergens to be detected can be detected, and allergens can be efficiently detected.

(Item 9) A non-transitory computer readable medium storing a program according to one aspect is a non-transitory computer readable medium storing a program for causing a processor to execute deriving processing that derives, based on a set of allergens that are detectable without being distinguished from one another among a plurality of allergens to be detected and data (reference data) that indicates a plurality of peptides produced by subjecting each allergen to a cleavage process, first peptides produced in common when the plurality of allergens included in the set are subjected to the cleavage process and at least one of parameters for detecting the first peptides (corresponding to step S1005 in the flowchart of FIG. 5), and setting processing that sets a condition of mass spectrometry to detect at least one of the first peptides (corresponding to step S1007). Thus, an appropriate peptide selected from the plurality of peptides derived from the plurality of allergens to be detected can be detected, and allergens can be efficiently detected.

The present invention is not limited to the contents of the above-mentioned embodiments. Other aspects that are considered within the scope of the technical idea of the present invention are also included in the scope of the present invention.

The invention claimed is:

1. A mass spectrometry control device comprising:
a deriver that derives, based on a set of allergens that are detectable without being distinguished from one another among a plurality of allergens to be detected and data that indicates a plurality of peptides produced by subjecting each allergen to a cleavage process, first peptides produced in common when the plurality of allergens included in the set are subjected to the cleavage process and at least one of parameters for detecting the first peptides; and
a setter that sets a condition of mass spectrometry to detect at least one of the first peptides.

2. The mass spectrometry control device according to claim 1, wherein the deriver derives, from the first peptides, second peptides obtained excluding a peptide produced when an allergen not to be detected or an allergen other than the plurality of allergens included in the set is subjected to the cleavage process, and at least one of parameters for detecting the second peptides, and
the setter sets a condition of mass spectrometry to detect at least one of the second peptides.

3. The mass spectrometry control device according to claim 2, wherein the plurality of allergens are a plurality of allergens selected from milk, chicken egg, wheat, barley, rye, oat, mustard, sesame, macadamia nuts, pistachio nuts, Brazil nuts, walnuts, peanuts, hazelnuts, buckwheat, shrimp, crab, ovalbumin, lysozyme, casein, lactoglobulin, high molecular weight glutenin, and low molecular weight glutenin.

4. The mass spectrometry control device according to claim 2, wherein cleavage by at least one of trypsin and Lys-C is performed in the cleavage process.

5. The mass spectrometry control device according to claim 2, wherein the setter sets a condition of tandem mass spectrometry or liquid chromatography/tandem mass spectrometry.

6. The mass spectrometry control device according to claim 2, wherein the parameter includes a mass-to-charge ratio of precursor ions in the mass spectrometry.

7. A mass spectrometry control device comprising the mass spectrometry control device according to claim 2.

8. A mass spectrometry method comprising:
deriving, based on a set of allergens that are detectable without being distinguished from one another among a plurality of allergens to be detected and data that indicates a plurality of peptides produced by subjecting each allergen to a cleavage process, first peptides produced in common when the plurality of allergens included in the set are subjected to the cleavage process and at least one of parameters for detecting the first peptides; and
setting a condition of mass spectrometry to detect at least one of the first peptides.

9. A non-transitory computer readable medium storing a program for causing a processor to execute:
deriving processing that derives, based on a set of allergens that are detectable without being distinguished from one another among a plurality of allergens to be detected and data that indicates a plurality of peptides produced by subjecting each allergen to a cleavage process, first peptides produced in common when the plurality of allergens included in the set are subjected to the cleavage process and at least one of parameters for detecting the first peptides; and
setting processing that sets a condition of mass spectrometry to detect at least one of the first peptides.

* * * * *